United States Patent
Meyers et al.

(10) Patent No.: US 7,991,357 B2
(45) Date of Patent: *Aug. 2, 2011

(54) INTELLIGENT SENSOR OPEN ARCHITECTURE FOR A CONTAINER SECURITY SYSTEM

(75) Inventors: Richard C. Meyers, Longboat Key, FL (US); Ron Martin, Towson, MD (US)

(73) Assignee: System Planning Corporation, Arlington, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/917,409

(22) Filed: Nov. 1, 2010

(65) Prior Publication Data

US 2011/0044207 A1    Feb. 24, 2011

Related U.S. Application Data

(63) Continuation of application No. 11/598,826, filed on Nov. 14, 2006, now Pat. No. 7,853,210.

(60) Provisional application No. 60/735,839, filed on Nov. 14, 2005.

(51) Int. Cl.
*H04B 7/00*    (2006.01)

(52) U.S. Cl. ............... 455/41.2; 340/539.13; 340/545.6; 455/423; 455/404.2

(58) Field of Classification Search ............... 455/404.2, 455/423, 435.1, 458, 41.1, 41.2, 519, 517, 455/518; 340/539.13, 545.6, 585
See application file for complete search history.

(56) References Cited

U.S. PATENT DOCUMENTS

| | | | |
|---|---|---|---|
| 6,687,609 B2 * | 2/2004 | Hsiao et al. | 701/207 |
| 7,098,784 B2 * | 8/2006 | Easley et al. | 340/539.13 |
| 2006/0094402 A1 * | 5/2006 | Kim | 455/411 |

* cited by examiner

*Primary Examiner* — Lana N Le
*Assistant Examiner* — Ping Y Hsieh

(57) ABSTRACT

A system and method for interfacing with sensors using an open architecture and standards based approach is provided. A sensor controller located on each container and any variety of one or more sensors are equipped with complementary short range wireless communications devices. The sensor may adhere to a predefined interface specification such that it may be automatically commissioned into, and operation in conjunction with the sensor controller and the container security system.

5 Claims, 4 Drawing Sheets

Sensor Configuration Table

| Paired Container Address | Address number |
|---|---|
| Sensor Type | Temperature<br>Visible Light<br>Infrared<br>Acoustic<br>Vibration<br>Motion<br>Microbolometer<br>Radiation<br>Haz Chem<br>Explosive detector<br>Door switch<br>Smoke Detector<br>Other |
| Data Format | Dec, INT, Binary, other |
| Dynamic Range | No. bits |
| Trigger thresholds | Level value |
| Battery Life | Volts, hours, days |

Fig. 4

INTELLIGENT SENSOR OPEN ARCHITECTURE FOR A CONTAINER SECURITY SYSTEM

CLAIM OF PRIORITY

This application is a continuation of prior application Ser. No. 11/598,826 filed Nov. 14, 2006, which in turn claims priority to U.S. Provisional Patent Application No. 60/735,839, filed Nov. 14, 2005.

BACKGROUND OF THE INVENTION

1. Field of the Invention

The present invention relates generally to container security and, more particularly, to sensor communication within a shipping container security system.

2. Background of the Invention

In today's efficiency conscious transportation environment, there is a strong need to cost-effectively and accurately track the location of containers, and groups of containers shipped together as a lot, at various stages during the supply chain. This need exists both in the United States and abroad.

Despite the strong need few solutions, if any, have been able to provide the accuracy needed to suit the transportation industry and the government agencies charged with monitoring shipments. This lack of an acceptable solution is due to many factors which complicate interstate and international shipping. Shipping containers are used to transport most of the commerce entering, leaving, and transiting or moving within the United States. It is estimated that there are over 6 million containers moving in global commerce. Shipping containers have revolutionized the transportation of goods by greatly reducing the number of times goods must be loaded and unloaded during transport. However, at the same time, this same advantage has created a major problem in that it is very difficult to monitor and track the location of each container during transport and in most cases the containers look very similar, so it is virtually impossible to ascertain the contents of containers without opening them up to inspect them.

To adequately monitor containers using electronic means an array of many different sensor types is required. These sensors may be temperature, light, acoustics and vibration, radiation, chemical, door opening, tampering, and many more. In many ways the more sensors that are available in the container monitoring system, the more intelligent the system may be to detect a wide range of tampering and potential threats. Unfortunately, the addition of many sensors to a monitoring system can quickly complication implementation and escalate cost to a level where the system is not practical.

Also, for the system to operate properly various sensors often need to be placed in specific locations and these are not always nearby the device which controls and interfaces to these sensors. In these cases, it is highly impractical for devices to be wired or tethered in some fashion, and a wireless interface is the only reasonable approach for connectivity to occur. At the same time, a wireless interface adds complexity to the system, and field technicians can often spend hours attempting to interface sensors with the associated control devices.

Thus, a solution is needed for simplifying addition of sensors to a container monitoring system using an open architecture and standards based design. This concept has been used in the computer industry in recent years. For example, interfacing to a printer or scanner even as recently as a few years ago was often a cumbersome task. Specific drivers needed to be loaded in particular sequence and anyone who has used a computer in recent years can remember hours of struggling with various peripheral devices. More recently, computer physical interface and software interfaces have become more sophisticated as to provide the system with the ability to automatically recognize these devices and seamlessly integrate them. If one were to plug in most devices into a computer USB port today, the compute would automatically recognize theses devices and moments after plugging in the cable they are ready to use.

The same concept applies to a container security system. Most frequently, different sensors are built by different manufacturers, but a common interface standard would alleviate many of the engineering, installation, and maintenance issues associated with complex container monitoring and security systems.

DESCRIPTION OF THE RELATED ART

A container security system as described by System Planning Corporation (SPC) (U.S. Pat. No. 7,098,784) herein referred to as "the SPC Invention", performs many of the functions to monitor containers, their content, and to detect tampering within a container during transit. This is accomplished through a device is which located on a container, which performs multiple functions. Some of these functions may include controlling various sensors, collecting the data from these sensors and transmitting this data back to a central monitoring station. The central monitoring station may also send commands and information to individual containers equipment with this device.

To enable information to be transmitted to and from the container, there are several communications subsystems including a satellite or cellular communications device, or both. The SPC invention also describes the utilization of a short range wireless or local area communication channel to communicate with various sensors and other elements within the container. The SPC invention utilizes the satellite or cellular communications channel to communicate and send status and alarms to a central monitoring station.

A problem with the SPC invention is that it does go as far as suggesting the use of an open architecture based communications and interface standard for the various sensors, so they can be seamlessly and automatically be integrated into the container monitoring system without special modifications, programming, or other customization.

SUMMARY OF THE INVENTION

To address the problems and limitations noted above, a system and method for a standards based open architecture sensor communications system is provided. Embodiments of the present invention comprise a system and method of for allowing the addition of sensors to a container monitoring system in a quick, cost efficient, and realizable manner using an open architecture standards based design.

The present invention allows sensors to be integrated and operate in conjunction with container monitoring and security systems, such that a sensor simply needs to be activated and paired with a sensor controller in the vicinity, and the sensor may be automatically commissioned into the system.

According to a first preferred embodiment, a sensor controller with a short range wireless communications device communicates with one or more sensors with complementary short range wireless communication devices. These components communicate via a standard radio frequency interface and a predetermined protocol. The controller element, received signals transmitted from the sensor elements indicating their capability and interface format, performs diagnostics, and then completes a protocol that allows them to be commissioned such that they are automatically integrated into the system for operation. The sensor control element may request authorization and receive acknowledgement from a central monitoring system to add new sensors to the monitoring network.

The accompanying drawings, which are incorporated in and constitute a part of this specification, illustrate various embodiments of the invention and, together with the description, serve to explain the principles of the invention.

BRIEF DESCRIPTION OF THE DRAWINGS

FIG. 4 shows a sensor configuration table which is used by the sensor controller to commission the sensor for operation.

DESCRIPTION OF THE PREFERRED EMBODIMENTS

The present invention provides a unique system and method for a container monitoring and security system operating with a plurality of varied sensor devices.

Throughout this specification, preferred embodiments of the invention are described in detail below with reference to the accompanying drawings. In the embodiments, various examples and illustrative embodiments are provided. It should be understood that these embodiments and examples are provided purely for purposes of illustration. The present invention is limited solely by the claims appended hereto.

Figure 1:
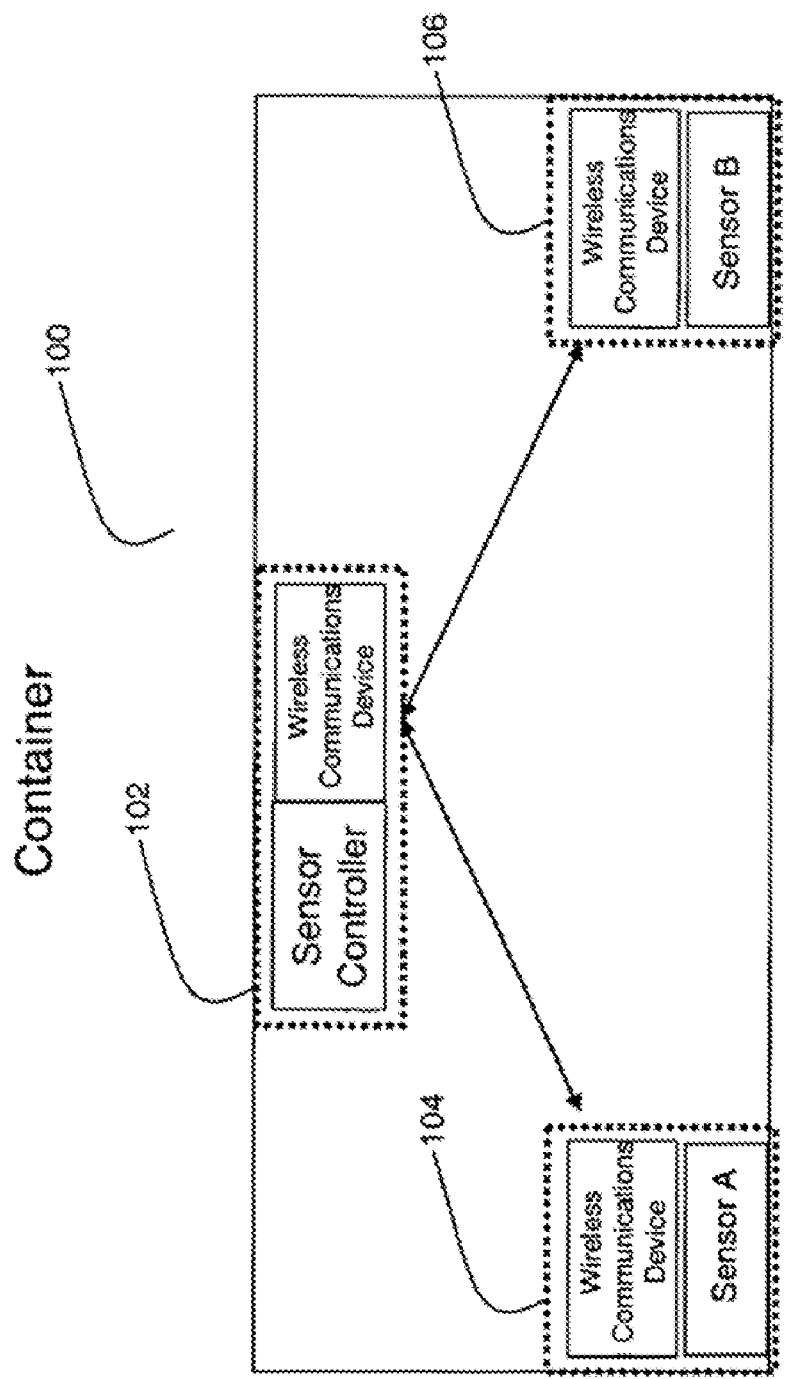
FIG. 1 shows a functional system configuration of sensor controller device and two sensors in an open architecture configuration.

With reference now to FIG. 1, and for the purposes of explanation, a basic shipping container 100 has a system which is designed to collect data from a variety of sensors 104 and 106. These sensors may include at least one sensor from the group of sensors containing: temperature sensor, visible light sensor, acoustic sensor, vibration sensor, motion sensor, microbolometer, radiation sensor, hazardous chemical, explosives sensor, proximity sensor, infrared sensor, door switch sensor, and smoke detector.

Each sensor 104, 106 may include a sensor section (sensor A, sensor B) and a wireless communications device.

According to the embodiments of the present invention, containers 100 are equipped with a sensor controller device 102 which controls, monitors, receives status and sensory data from the variety of sensors via a short range wireless communications device.

The short range wireless communications device comprises a channel protocol or wireless local area network (WLAN) and may be any one of a number of standards such as Bluetooth, Zigbee, 802.11, or any other standards based or proprietary wireless protocol capable of transmitting data within a few feet to a several hundred feet.

Figure 2:
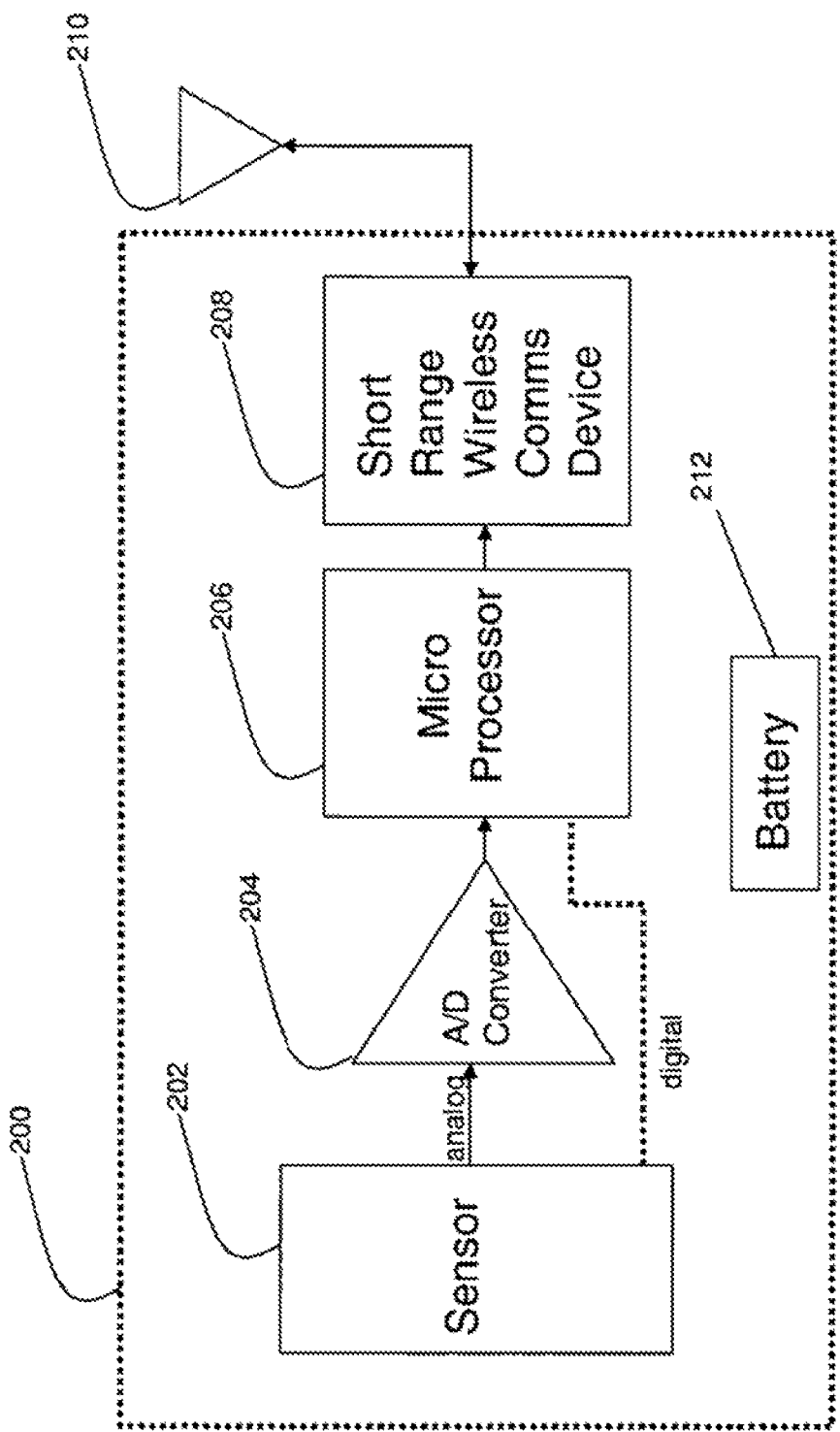
FIG. 2 shows an example of a configuration of an intelligent sensor configuration system.

As shown in FIG. 2, an intelligent sensor system 200 comprises a sensor 202 which may be a sensor with an analog or digital output; an analog-to-digital converter 204 which is used to convert the analog sensor output into a digital format which can be received by a micro processor device 206; and a short range wireless communications device 208. The wireless communications device 208 connects to an antenna device 210 which emanates and receives radio frequency signals and which may be mounted anywhere on the interior or exterior of the container. The system also contains a battery system 212 to power the sensor and other systems.

Figure 3:
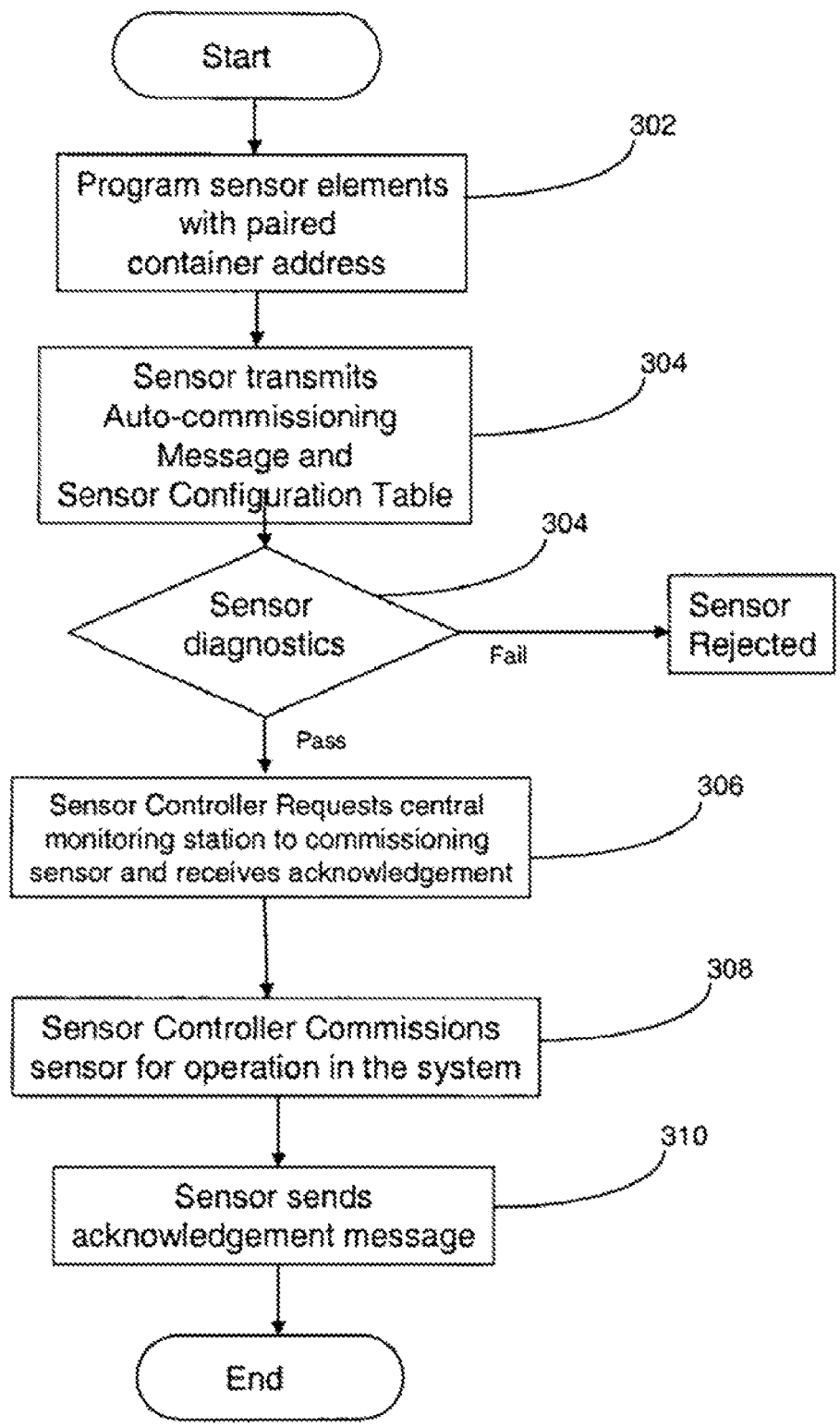
FIG. 3 shows a flow chart of the sensor commissioning and activation method.

With reference now to FIG. 3, the method of interface and communications between the sensor controller device and the sensors is discussed. In accordance with a preferred embodiment of the present invention, in step 302 prior to shipment or at the time of installation, the intelligent sensors are programmed at 302 with a sensor configuration table as shown in FIG. 4.

As provided in the sensor configuration table of FIG. 4, a variety of values may be stored that allow the sensor controller and overall container monitoring system to recognize the sensor, its capabilities, and operational parameters. The table may include certain items in any order.

The table may include a container address to which that particular sensor may be paired. While it is anticipated that this value may be programmed in the factory prior to shipment, it may also be changed in the field during installation.

The table may additionally include a sensor type which identifies the specific type of sensor tot the sensor controller.

The data format of the sensor may be provided in the table and may be represented in any variety of formats including integer, decimal, binary, or any other give numbering format.

The table may also include the dynamic range of the sensor which indicates the range of lowest level detection signals to highest levels.

Trigger thresholds may be provided which may be used to indicate when a sensor may fire or activate.

The table may also include a battery life of the intelligent sensor system which may be represented in voltage or time remaining.

Once again in FIG. 3, in a preferred embodiment of the present invention, in step 304, the intelligent sensor may transmit an auto-commissioning request message to the sensor controller. This message is a request to come into the sensor network. Prior to the sensor controller allowing the requesting sensor into the network, the controller may perform certain diagnostics on said sensor. These diagnostics for example may include readings certain sensor values, commanding the sensor to runs self tests, and varying thresholds to force the sensor to activate. Should the diagnostics pass and the sensor controller determine that the sensor is operating properly, the controller may send a message to the central monitoring station in step 306 requesting to commission said sensor into the network. Upon receiving an acknowledgement from the central monitoring station, the sensor controller may commission said sensor for operation in step 308 and may receive verification of operational status from the newly commissioned sensor in step 310. Alternatively, the sensor controller may simply notify the central monitoring status of the addition of a new sensor without requesting permission first, or even add said sensor without notification.

What is claimed is:

1. A method for providing an open standard wireless interface between a sensor control element and one or more sensors which are associated with a container during transit and which together form a monitoring network, the method comprising:

programming a sensor element with a sensor configuration table containing sensor configuration data regarding at least one operating parameter of the sensor element;

transmitting a message from the sensor element to the sensor control element, wherein the message includes sensor configuration data;

transmitting a request from the sensor element to the sensor control requesting to be accepted into the monitoring network;

analyzing the sensor configuration data to determine whether the sensor element should be added to the monitoring network; and transmitting a message from the sensor control element to the sensor element either confirming inclusion in the network or declining the request to join.

2. The method of claim 1, wherein the method includes the step of transmitting a message from the sensor control element to a central monitoring station indicating that a new sensor has been integrated into the monitoring network.

3. The method of claim 1, wherein the sensor configuration data transmitted to the sensor control element by the sensor element contains information including the sensor type, trigger thresholds, dynamic range, data formats, battery power, and other data pertinent to the operation of said sensor element within the container security system.

4. The method of claim 1, wherein the sensor control element and the sensor operate in a manner which is automatically commissioned into the container security system without field programming, wiring, or manual intervention.

5. The method of claim 1, wherein the sensor control element performs diagnostics on the requesting sensor element.

* * * * *